| United States Patent [19] | [11] Patent Number: 4,975,487 |
|---|---|
| Sun | [45] Date of Patent: Dec. 4, 1990 |

[54] POLYMERIC POLYBLEND COMPOSITION

[75] Inventor: Yun C. Sun, Midland, Mich.

[73] Assignee: The Dow Chemical Company, Midland, Mich.

[21] Appl. No.: 269,041

[22] Filed: Nov. 9, 1988

Related U.S. Application Data

[63] Continuation-in-part of Ser. No. 141,169, Jan. 6, 1988.

[51] Int. Cl.$^5$ .................. C08L 31/02; C08L 51/04
[52] U.S. Cl. ................... 525/80; 427/385.5; 428/424.6; 525/63; 525/72; 525/74; 525/76; 525/78; 525/86; 264/176.1; 264/500; 264/299
[58] Field of Search .......................... 525/80

[56] References Cited

U.S. PATENT DOCUMENTS

| 2,459,125 | 1/1946 | Cheyney | 525/239 |
|---|---|---|---|
| 3,662,028 | 5/1972 | Wineland et al. | 260/899 |
| 3,678,133 | 7/1972 | Ryan | 525/80 |
| 3,762,979 | 10/1973 | Hanel et al. | 156/333 |
| 4,362,834 | 12/1982 | Lefevre et al. | 524/297 |
| 4,594,394 | 6/1986 | Bezoari | 525/331.5 |

*Primary Examiner*—Jacob Ziegler
*Attorney, Agent, or Firm*—Thomas D. Zindrick

[57] ABSTRACT

A polymeric polyblend comprising a vinylidene chloride interpolymer and a thermoplastic graft copolymer.

9 Claims, No Drawings

POLYMERIC POLYBLEND COMPOSITION

This application is a continuation-in-part of the copending application Ser. No. 141,169, filed Jan. 6, 1988.

FIELD OF THE INVENTION

The present invention relates generally to a polymeric polyblend. Specifically, the present invention relates to a polyblend of a vinylidene chloride interpolymer and a thermoplastic graft copolymer.

BACKGROUND OF THE INVENTION

Vinylidene chloride interpolymers are well-known in the prior art. In the past, vinylidene chloride interpolymers have been produced by an emulsion or suspension polymerization process. Both the emulsion and suspension polymerization processes produce an aqueous dispersion of polymer particles having a relatively small particle diameter. The polymer particles are recovered from the aqueous dispersion by drying or other means for removing a majority of the aqueous phase. In the past, the practice has been to extrude the vinylidene chloride interpolymer directly from the form in which it is recovered.

In some instances, it is desirable to form the vinylidene chloride interpolymer into pellets prior to final extrusion. Unfortunately, it has been found that vinylidene chloride interpolymers are not easily extrudable. Attempts to extrude vinylidene chloride interpolymers on certain extrusion equipment have proven unsatisfactory due to the adhesion of the resin to interior walls of the extruder, which leads to an excessively long polymer residence time and an undesirable level of carbon contamination in said pellets.

Vinylidene chloride interpolymers are well-known for their excellent barrier to mass transport of atmospheric gases and moisture vapor. These interpolymers have limited areas of application, however, because of poor melt processing characteristics. In particular, vinylidene chloride interpolymers in a melt plasticized state have poor heat stability and low melt strength. These same interpolymers, when fabricated, tend to be brittle and to have low impact strength.

Similarly, thermoplastic graft copolymers are well-known in the prior art. Such rubbers are well-known for their excellent physical properties. Specifically, thermoplastic graft copolymers possess relatively high impact strength. Unfortunately, thermoplastic graft copolymers provide a relatively low degree of barrier to mass transport of atmospheric gases and water vapor when compared to vinylidene chloride interpolymers.

It would be desirable to produce a polymeric polyblend possessing a good balance of physical properties.

It is further desirable to produce a vinylidene chloride interpolymer which interpolymer is capable of being extruded without producing an unacceptable level of carbon contamination. It is to this goal that the present invention is directed.

SUMMARY OF THE INVENTION

A polymeric polyblend comprising:

(A) a vinylidene chloride interpolymer formed from a monomer mixture comprising vinylidene chloride in an amount of from about 60 to about 98 weight percent, based on total weight of monomer mixture, and at least one monoethylenically unsaturated monomer copolymerizable therewith in an amount of from about 40 to about 2 weight percent, based on total weight of monomer mixture; and (B) from 1 to about 50 weight percent, based on total polymeric polyblend weight, of a thermoplastic graft polymer of a rubber substrate and at least one comonomer on the substrate, the substrate having a rubber glass transition temperature below 0° C., and the monomer selected from the group consisting of $C_1$-$C_8$ alkyl acrylates and $C_1$-$C_8$ alkyl methacrylates, provided that the monomer selected is different from the major monomeric component of the rubber substrate.

DETAILED DESCRIPTION OF THE INVENTION

The polymeric polyblends according to the present invention comprise two main components. The two main components are a vinylidene chloride interpolymer and a thermoplastic graft copolymer.

Physical properties of the polymeric polyblends depend largely upon two factors. One factor is the selection of the polymer components of the polyblends. A second factor is the ratio of polymer components to each other within said polyblends.

For the purposes of this invention, it is understood that the term "vinylidene chloride interpolymer" encompasses both homopolymers, copolymers, terpolymers, etc. of vinylidene chloride. The vinylidene chloride monomer may be copolymerized with at least one monoethylenically unsaturated monomer.

In preparing the monomer mixture, such mixture contains essentially all of the monomer to be polymerized. Vinylidene chloride monomer is present in an amount of at least about 60 weight percent, based on total weight of the monomer mixture. The preferred ranges, as is known to the skilled artisan, are dependent upon the presence and type of ethylenically unsaturated comonomer copolymerized therewith. Generally, the ethylenically unsaturated comonomer will be present in an amount of between about 40 weight percent and 1 weight percent, based on total weight of the monomer mixture.

The amount of ethylenically unsaturated comonomer is maintained below an amount effective to destroy the semicrystalline character of the interpolymer. By "semicrystalline character" it is meant that the interpolymer has between about 5 percent and about 95 percent crystallinity. Crystallinity values depend upon the measuring technique, and as used herein crystallinity is defined by the commonly used density method. See, for example, the discussion by R. A. Wessling, in Chapter 6 of *Polyvinylidene Chloride*, Vol. 5, Gordon and Breach Science Publishers, New York, 1977, the teachings of which are incorporated herein by reference.

Suitable ethylenically unsaturated comonomers copolymerizable with the vinylidene chloride monomer include vinyl chloride, alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of vinyl chloride, methyl acrylate, ethyl acrylate and methylmethacrylate.

When the ethylenically unsaturated comonomer employed is vinyl chloride, the vinyl chloride is preferably present in an amount of from about 30 to about 5 percent by weight of interpolymer and the amount of vinylidene chloride is from about 70 to about 95 percent by weight of interpolymer.

When the ethylenically unsaturated comonomer employed is an alkyl acrylate, the alkyl acetate is preferably present in an amount of from about 15 to about 2 percent by weight of interpolymer and the amount of vinylidene chloride is from about 85 to about 98 percent by weight of interpolymer.

Methods of forming the vinylidene chloride interpolymers suitable for use in the present invention are well-known in the prior art. The vinylidene chloride interpolymer is generally formed through an emulsion or suspension polymerization process. Exemplary of such processes are U.S. Pat. Nos. 2,558,728; 3,007,903; 3,642,743; and 3,879,359; and the methods described by R. A. Wessling, in *Polyvinylidene Chloride*, Gordon and Breach Science Publishers, New York, 1977, Chapter 3; all of which are incorporated herein by reference. Typically, the monomeric materials are emulsified or suspended in an aqueous phase. The aqueous phase contains a polymerization initiator and a surface active agent capable of emulsifying or suspending the monomeric materials in the aqueous phase. The polymerization of the monomeric materials is usually carried out with heating and agitation.

After polymerization is complete, the resulting suspension or emulsion of vinylidene chloride interpolymer has a majority of an aqueous phase. Thereafter, the slurry is cooled down, fed to a dewatering process to remove the water and dried.

To improve the impact resistance of the vinylidene chloride interpolymer, it is blended with a thermoplastic graft copolymer to provide a polymeric polyblend with good impact strength. The graft copolymers are produced from a rubber substrate and graft monomers on the rubber surface.

The vinylidene chloride interpolymer is present in the polymeric polyblend in an amount of from about 50 to about 99 weight percent, preferably from about 60 to about 95 weight percent, and most preferably from about 70 to about 94 weight percent, based on total weight of the polymeric polyblend. The thermoplastic graft copolymer is present in the polymeric polyblend according to the present invention in amounts ranging from a minimum weight percent of generally about 1, preferably about 5, and most preferably about 6; and a maximum weight percent of generally about 50, preferably about 40, and most preferably about 30, based on total weight of the polymeric polyblend.

The rubber substrates present in the graft copolymers are elastomers having glass transition temperatures below 0° C. Exemplary elastomers are selected from acrylate rubbers, preferably homo- or copolymers of alkyl acrylates containing up to 12 carbon atoms in the ester group which, for possible crosslinking, may be copolymerized with polyfunctional unsaturated monomers; diene rubbers (especially polybutadiene, polychloroprene, polyisoprene), olefin rubbers (such as ethylene polymer, ethylenevinyl acetate copolymers, EPDM rubbers) and silicone rubbers. The elastomers may be uncrosslinked or partially crosslinked or highly crosslinked.

Acrylate rubbers are preferred because of their stability. If an acrylate rubber is selected as the substrate, the comonomer should be selected from a monomer more compatible with vinylidene chloride interpolymer than the major monomeric component of the rubber substrate.

The acrylate rubber comprises an acrylate of the formula:

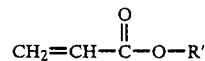

wherein R' is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate and the like; methoxymethyl acrylate; methoxyethyl acrylate, ethoxyethyl acrylate, butoxyethyl acrylate, ethoxypropyl acrylate, methylthioethyl acrylate, hexylthioethyl acrylate and the like; and $\alpha$- and $\beta$-cyanoethyl acrylate, $\alpha$-, $\beta$- and $\gamma$-cyanopropyl acrylate, cyanobutyl acrylate, cyanohexyl acrylate, cyanooctyl acrylate and the like. Often mixtures of two or more monomers and/or types of acrylate monomers are employed.

Preferably the acrylates are selected to have the formula wherein R' is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate and the like, and methoxyethyl acrylate, ethoxyethyl acrylate and the like. Both an alkyl acrylate and an alkoxyalkyl acrylate are used.

The rubber substrates are selected to have a volume average particle diameter within the range of from about 300 Angstroms to about 25,000 Angstroms. Preferably, the particles have a diameter within the range of from about 800 Angstroms to about 20,000 Angstroms.

The rubber substrates may be cross-linked so that they can retain their size and shape during subsequent polymer processing steps. This cross-linking can be achieved during the polymerization of the rubber substrates if a polyfunctional ethylenically unsaturated monomer is included in the polymerization recipe. As used in this disclosure, the term "cross-linked" denotes a polymer which at ambient temperatures is substantially insoluble in such organic solvents as tetrahydrofuran or cyclohexane. The rubber substrates of the present invention may contain up to about 2.0 percent of a cross-linking agent based on the weight of the elastomeric material forming monomer or monomers. The cross-linking agent can be any of the agents conventionally used for cross-linking acrylate rubbers and the like. Suitable examples include divinylbenzene, diallyl maleate, diallyl fumarate, diallyl adipate, allyl acrylate, allyl methacrylate, diacrylates, and dimethyl acrylates of polyhydric alcohols (e.g., ethylene glycol dimethacrylate, etc.) and the like.

Selectively grafted to the rubber substrate are comonomers selected from the group consisting of $C_1$-$C_8$ alkyl acrylates, $C_1$-$C_8$ alkyl methacrylates or mixtures thereof. When mixtures are employed, the comonomers have, as a major portion, $C_1$–$C_8$ alkyl acrylates, e.g., methyl, ethyl, propyl, butyl, 2-ethyl hexyl, stearyl, hydroxyether and tertiary butylaminoacrylates, or $C_1$–$C_8$ alkyl methacrylates, e.g., methyl, ethyl, propyl, butyl, octyl and lauryl methacrylate; and a minor proportion of one or more vinyl monomers. Exemplary vinyl monomers include styrene; acrylonitrile; vinyl acetate; methyl methacrylate; ethylenically unsaturated carboxylic acids such as, for example, acrylic, methacrylic, itaconic and maleic acids; isoprene; chloroprene; 1,3-butadiene; propylene; ethylene; and other common vinyl monomers.

Because of their compatibility to vinylidene chloride interpolymers, preferred comonomers are methyl methacrylate and ethyl methacrylate, or mixtures comprising at least 50 percent of the methyl methacrylate and/or ethyl methacrylate. The term "compatible" is intended to mean that the polymers, upon mixing, the polymers blend together sufficiently well for a particuular purpose. See, *Polymer Blends and Composites*, Manson et al., Plenum Press, pgs. 51–52 (1976), and Polymer Blends, Paul et al., Vol. 1, Academic Press, pgs. 17–19 (1978). For the purposes of this application, methyl methacrylate and ethyl methacrylate are considered to have good compatibility with vinylidene chloride interpolymers because of a beneficial adhesion between the components.

Methods of forming the thermoplastic graft copolymer are well-known to those skilled in the art. A general description of methods suitable for the preparation of the graft polymers are set forth in the *Kirk-Othmer Encyclopedia of Chemical Technology*, 3rd edition (1980).

In addition to the components of the polymeric polyblends, the present invention may contain minor amounts of additives. A variety of additives may be added to the polyblends of the present invention. Additive type and amount thereof will depend upon several factors. One factor is the intended use of the polyblends. A second factor is tolerance of the polyblends for the additives; that is, how much additive can be added before physical properties of the polymeric polyblends are adversely affected to an unacceptable level. Other factors are apparent to those skilled in the art of polymer formulation and compounding.

Additives which may be incorporated into the polymeric polyblends of the present invention are selected from the group consisting of plasticizers, heat stabilizers, light stabilizers, pigments, processing aids, lubricants and the like. Each of these additives is known and several types of each are commercially available.

The polymeric polyblends of the present invention are readily prepared by using conventional melt processing techniques for thermally sensitive polymers. Exemplary melt processing equipment includes heated two-roll compounding mills, Brabender mixers, Banbury mixers, single screw extruders, twin screw extruders and the like, which are constructed for use with thermally sensitive polymers. See, for example, the discussion by R. A. Wessling, in Chapter 11 of *Polyvinylidene Chloride*, Vol. 5, Gordon and Breach Science Publishers, New York (1977), the teachings of which are incorporated herein by reference. Desirable results are obtained when an extruder, either single screw or twin screw, is used for melt processing the polymeric polyblends of the present invention. Beneficially, sufficient mixing must be generated during melt processing to provide a visually homogeneous mixture with a reasonable mixing time.

In using conventional processing equipment for thermally sensitive polymers, two conditions should be met. The two conditions, which are interrelated, are processing time and processing temperature. In melt processing polymers, it is generally recognized that as processing temperatures increase, processing times must decrease in order to avoid undesirable results such as polymer degradation. This is especially true for vinylidene chloride interpolymers.

Melt processing must be accomplished at a temperature below that at which decomposition of the vinylidene chloride interpolymer becomes significant. Vinylidene chloride interpolymers may be melt processed at temperatures of up to about 200° C. provided processing time is less than about one minute. Temperatures greater than about 200° C. may be employed provided the processing time is sufficiently short and provided the vinylidene chloride interpolymer is not in contact with iron or other metallic elements known to catalyze the degradation of vinylidene chloride interpolymers. For example, vinylidene chloride interpolymers are melt processible at temperatures as high as about 230° C. at processing times of less than about 10 seconds when the vinylidene chloride interpolymer forms an inner layer in a coextruded structure.

One factor in determining satisfactory mixing times is the melt index of the components of the polyblend. If component melt indexes are nearly equal, a relatively short mixing time yields satisfactory results. If there is a disparity among component melt indexes, a longer mixing time is necessary.

A second factor in determining satisfactory mixing times is mixing shear rate. All other parameters being equal, a relatively low shear rate is needed when the components have a relatively low viscosity or a high melt index. Conversely, a relatively high shear rate is needed when the components have a relatively high viscosity or a low melt index. By way of example only, a polymeric polyblend comprising a high melt index, low density polyethylene requires a much shorter mixing time than a polymeric polyblend comprising a low melt index, high density polyethylene.

A third factor in determining satisfactory mixing times is temperature. As noted hereinbefore, an upper limit on temperature is the temperature at which decomposition of the vinylidene chloride interpolymer becomes significant. A lower limit on temperature is dictated by the polymeric polyblend component which has the greatest melting point. If the temperature does not exceed the melting point of that polymeric polyblend component, a visually homogeneous melt will be difficult, if not impossible, to obtain.

A fourth factor in determining satisfactory mixing times is mixing efficiency of the melt processing equipment. Certain melt processing equipment mixes more efficiently than other melt processing equipment. Selection of melt processing equipment which will produce a visually homogeneous melt within a reasonable processing time is, however, not difficult and can be accomplished without undue experimentation.

A fifth factor in determining satisfactory mixing times is polymer feed form. The polymeric components of the polyblends are generally available either in finely divided powder form or in pellet form. Either form is suitable for purposes of the present invention.

Methods of forming the polymers are well-known to those skilled in the art. A general description of methods suitable for the preparation of the polymers are set forth in the *Kirk-Othmer Encyclopedia of Chemical Technology*, 3rd edition (1980).

The polymeric polyblends of the present invention can be used to form a variety of films or other articles. Films and other articles are conventionally prepared by casting, blowing, extrusion molding, injection molding, blow molding, coextrusion or conventional lamination processes, or calendering techniques.

More specifically, the polymeric polyblends of the present invention can be used to form relatively rigid containers used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals. Most organic polymers such as the polyolefins, styrene polymers and the like, by themselves, do not possess sufficent resistance to transmission of atmospheric gases and vapors. Consequently, multilayer sheet structures employed in packaging materials have organic polymer skin layers laminated on each side of the polymeric polyblend barrier layer, generally with glue layers used to promote adhesion between the barrier layer and dissimilar material layers. As is well-known in the art, such laminated structures are fabricated with conventional injection molding, extrusion molding, coextrusion or conventional lamination processes, or similar techniques.

The present invention is illustrated in further detail by the following examples and comparative examples. The examples and comparative example are for purposes of illustration only and are not to be construed as limiting the scope of the present invention. All parts and percentages are by weight unless otherwise specifically noted.

EXAMPLES

Polymeric polyblends according to the present invention are prepared with various polymeric components. Each of the polymeric components used in the examples and comparative examples is coded and described hereinafter at Table I.

TABLE I

| Polymer Components | |
|---|---|
| Code | Polymer |
| PVDC | A resin containing 98% of a vinylidene chloride copolymer, 1% epoxidized linseed oil and 1% Citroflex A-4, an acetyl tributyl citrate commercially available from Morflex Chemical Company. The vinylidene chloride copolymer has 80% vinylidene chloride and 20% of vinyl chloride polymerized therein. The copolymer has a melting point of 162° C. and a weight average molecular weight of 80,000. |
| BA/MA | A methyl methacrylate grafted butyl acrylate commercially available from Rohm and Haas, under the trade designation KM-330. The methyl methacrylate grafted butyl acrylate has 79.2% butyl acrylate and 20.8% of methyl methacrylate grafted thereto, both percentages being based upon the graft copolymer weight. |

Various ratios of the polymer components, set forth in Table I, are prepared into samples and subjected to physical property testing, which is described below.

PREPARATION OF MOLDED SAMPLES

Mold samples to test the physical properties of the polymeric polyblends of this invention are prepared as follows. Various combinations of the polymer components are prepared into pellets and subjected to physical property testing which is described below.

The polymeric polyblend components are added to an extruder hopper and thereafter converted to a molten polyblend within the extruder. The molten polyblend is extruded through a single strand die, passed through a water bath and then pelletized. The strand die has an internal diameter of 0.32 cm. Pelletizing is accomplished using a Model 304, 15.24-cm Strand Cutter commercially available from Conair, Inc. The pellets are then compression molded to prepare test specimens according to ASTM-256, Method A.

MELT ADHESION TESTING

The testing of melt adhesion of the polymeric polyblend comprises the use of a two-roll mill test consisting of two steam heated rolls approximately three inches in diameter and six inches in length that rotate in opposite directions. There is an adjustable gap between the two rolls which are rotating at different speeds. The rolls moving at different speeds cause a shearing effect on the material being tested.

The general sample testing procedure for polyblend is the following:

(1) steam pressure is adjusted to achieve the desired roll temperature, generally 340° F. to 350° F.;
(2) a 200-gram sample is weighed;
(3) the rolls are started and closed to provide a gap of about zero;
(4) time is monitored as the sample is poured on the rolls;
(5) the gap between the rolls is slowly opened as the material melts and adheres to the rolls;
(6) when the material is fully melted, i.e., no visible solids are present, the time elapsed since the start of step (4) is recorded; and
(7) the gap between the rolls is adjusted so that a small roll of material about one-half inch in diameter is between them.

The roll adhesion is the relative adhesion of the main mass of the material to the roll surface and is determined by how easily the material can be scraped from the roll.

Data regarding the adhesion of the polymeric polyblends to the roll is generated by the test. The adhesion rating is characterized by a rating on a scale of 0 to 5.

0—The main mass of polyblend will lift from the roll without leaving any material in a sheet.

1—The polyblend will lift from the roll but will leave a spotty thin coating.

2—The polyblend will not lift from the roll in a sheet. It is necessary to scrape the material off the roll, but it is possible to get the roll fairly clean.

3—The polyblend will not lift from the roll at all. A path will be scraped. A thin soft layer will remain at the boundary between the roll and melt.

4—The polyblend must be scraped to the end of the roll. A fairly heavy layer will remain on the roll and melt.

5—There is a hard layer of material at the boundary and melt. It is very hard to scrape through to the polyblend.

The results of the physical property testing are set forth in Table II.

TABLE II

| Sample No. | Polymer Code [1] | Component Amount [2] | Impact Strength [3] | Oxygen Permeability [4] | Melt Adhesion [5] |
|---|---|---|---|---|---|
| 1 | PVDC | 90 | 1.4 | 0.4 | 2 |
|   | BA/MA | 10 |     |     |   |
| 2 | PVDC | 80 | 3.9 | 1.2 | 1 |
|   | BA/MA | 20 |     |     |   |
| 3 | PVDC | 70 | 7.5 | 2.8 | 0 |
|   | BA/MA | 30 |     |     |   |
| 4 | PVDC | 60 | 16.4 | — | 0 |
|   | BA/MA | 40 |     |     |   |

[1] Polymer components as set forth in Table I.
[2] Amounts are in percentages based upon weight of blend.
[3] Notched Izod Impact Strength measures the toughness of the samples which contain a notch, in foot-pounds per inch notch. Notched Izod Impact Strength is determined according to American Society of Testing and Materials Test Method D-256, Method A.
[4] Oxygen Permeability ($PO_2$) according to (cubic centimeters of oxygen) (mil of sample thickness)/100 square inches (day) (atmosphere of pressure). $PO_2$ of the test specimens is measured on an instrument commercially available from Model Controlled Inc. under the trade designation OXTRAN 1050.
[5] Melt adhesion on a scale of 0 to 5.

As can be seen from the above table, the polymeric polyblends of the present invention possess a good balance of physical properties.

What is claimed is:

1. A polymeric polyblend comprising:
   (A) from about 99 to about 50 weight percent of a vinylidene chloride interpolymer formed from a monomer mixture comprising vinylidene chloride in an amount of from about 60 to about 98 weight percent, based on total weight of monomer mixture, and at least one monoethylenically unsaturated monomer copolymerizable therewith in an amount of from about 40 to about 2 weight percent, based on total weight of monomer mixture; and
   (B) from 1 to about 50 weight percent, based on total polymeric polyblend weight, of a grafted acrylate rubber, said grafted acrylate rubber comprising a monomer, selected from the group consisting of $C_1$–$C_8$ alkyl acrylates and $C_1$–$C_8$ alkyl methacrylates, grafted to an acrylate rubber substrate, wherein the monomer selected is more compatible with vinylidene chloride interpolymer than the major monomeric component of the rubber substrate and the grafted acrylate rubber substrate has a rubber glass transition temperature below 0° C.

2. The polymeric polyblend of claim 1, wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile and methacrylonitrile.

3. The polymeric polyblend of claim 1, wherein the rubber substrate is selected from the group consisting of acrylate rubbers, diene rubbers, olefin rubbers, and silicone rubbers.

4. The polymeric polyblend of claim 3, wherein the acrylate rubber substrate is selected form the group consisting of ethyl acrylate, butyl acrylate, 2-hexyl acrylate, 2-ethylhexyl acrylate and methyl methacrylate.

5. The polymeric polyblend of claim 1, wherein the comonomer is a $C_1$–$C_8$ alkyl acrylate selected from the group consisting of methyl, ethyl acrylate, propyl acrylate, butyl acrylate, 2-ethylhexyl acrylate, stearyl acrylate, hydroxyether acrylate and t-butylamino acrylate.

6. The polymeric polyblend of claim 1, wherein the comonomer is a $C_1$–$C_8$ alkyl methacrylate selected from the group consisting of methyl methacrylate, ethyl methacrylate, propyl methacrylate, butyl methacrylate, octyl methacrylate, and lauryl methacrylate.

7. The polymeric polyblend of claim 1, wherein the comonomer is polymerized with minor proportions of at least one vinyl monomer.

8. The polymeric polyblend of claim 7, wherein the vinyl monomers are selected from the group consisting of styrene, acrylonitrile, vinyl acetate, methyl methacrylate, ethylenically unsaturated carboxylic acids, isoprene, chloroprene, 1,3-butadiene, propylene and ethylene.

9. The polymeric polyblend of claim 8, wherein the ethylenically unsaturated carboxylic acid is selected from the group consisting of acrylic, methacrylic, itaconic and maleic acids.

* * * * *